(12) United States Patent
Balsells et al.

(10) Patent No.: US 9,285,034 B2
(45) Date of Patent: Mar. 15, 2016

(54) CARTRIDGE SEAL ASSEMBLIES AND ASSOCIATED METHODS

(71) Applicant: BAL SEAL ENGINEERING, INC., Foothill Ranch, CA (US)

(72) Inventors: Pete Balsells, Foothill Ranch, CA (US); Farshid Dilmaghanian, Foothill Ranch, CA (US); Derek Changsrivong, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 0 days.

(21) Appl. No.: 14/242,687

(22) Filed: Apr. 1, 2014

(65) Prior Publication Data

US 2014/0210166 A1    Jul. 31, 2014

Related U.S. Application Data

(63) Continuation of application No. 12/841,056, filed on Jul. 21, 2010, now Pat. No. 8,684,362.

(60) Provisional application No. 61/233,398, filed on Aug. 12, 2009.

(51) Int. Cl.
*F16J 15/32* (2006.01)

(52) U.S. Cl.
CPC ............ *F16J 15/3208* (2013.01); *F16J 15/322* (2013.01); *F16J 15/3212* (2013.01); *F16J 15/3232* (2013.01)

(58) Field of Classification Search
USPC .......... 277/353, 572, 549, 551, 553, 576, 577
See application file for complete search history.

(56) References Cited

U.S. PATENT DOCUMENTS

| | | |
|---|---|---|
| 2,368,137 A | 1/1945 | Harmon |
| 2,413,671 A | 12/1946 | Wolf et al. |
| 2,434,485 A | 1/1948 | Chambers, Jr. |
| 2,435,943 A | 2/1948 | Nehls |
| 2,466,335 A | 4/1949 | Stearns |
| 3,630,533 A | 12/1971 | Butler |
| 5,139,276 A | 8/1992 | Balsells |
| 5,265,890 A | 11/1993 | Balsells |
| 5,979,904 A | 11/1999 | Balsells |
| 5,984,316 A | 11/1999 | Balsells |
| 6,050,572 A | 4/2000 | Balsells et al. |

(Continued)

OTHER PUBLICATIONS

Office Action dated Mar. 2, 2012 from corresponding U.S. Appl. No. 12/841,056.

(Continued)

*Primary Examiner* — Kristina Fulton
*Assistant Examiner* — Eugene G Byrd
(74) *Attorney, Agent, or Firm* — Klein, O'Neill & Singh, LLP

(57) ABSTRACT

The present cartridge seal assemblies pertain to rotary lip-type seals. In certain embodiments, a sealing member is constructed of a relatively hard material that increases the lifespan of the sealing member. The sealing member is energized with a canted-coil spring, which in some embodiments includes an adjustable spring force. The present embodiments enable control of sealing force to achieve an appropriate sealing force between the sealing member and the shaft based on factors such as temperature, pressure, rotary speed, properties of fluid media, etc. to achieve longer seal life.

15 Claims, 13 Drawing Sheets

(56) References Cited

U.S. PATENT DOCUMENTS

| | | |
|---|---|---|
| 6,161,838 A | 12/2000 | Balsells |
| 6,173,964 B1 | 1/2001 | Bell et al. |
| 6,264,205 B1 | 7/2001 | Balsells |
| 6,641,141 B2 | 11/2003 | Schroeder |
| 7,210,398 B2 | 5/2007 | Balsells |
| 7,344,140 B2 | 3/2008 | Ikeda |
| 8,096,599 B2 | 1/2012 | Cheung et al. |
| 2002/0153664 A1 | 10/2002 | Schroeder |
| 2003/0157846 A1 | 8/2003 | Poon et al. |
| 2005/0093246 A1 | 5/2005 | Dietle et al. |
| 2009/0146379 A1* | 6/2009 | Foster et al. .......... 277/307 |
| 2010/0237566 A1 | 9/2010 | Balsells et al. |

OTHER PUBLICATIONS

Final Office Action dated Jun. 20, 2012 from corresponding U.S. Appl. No. 12/841,056.

Office Action dated Nov. 29, 2012 from corresponding U.S. Appl. No. 12/841,056.

Office Action dated Aug. 16, 2013 from corresponding U.S. Appl. No. 12/841,056.

Notice of Allowance dated Feb. 4, 2014 from corresponding U.S. Appl. No. 12/841,056.

* cited by examiner

CARTRIDGE SEAL ASSEMBLIES AND ASSOCIATED METHODS

CROSS-REFERENCE TO RELATED APPLICATION

This is a continuation application of Ser. No. 12/841,056, filed Jul. 21, 2010, which is a regular application claiming priority to provisional application Ser. No. 61/233,398, filed on Aug. 12, 2009, the entire contents of which are hereby incorporated herein by reference.

FIELD

Cartridge seal assemblies are generally discussed herein with particular reference to seal assemblies having adjustable and non-adjustable force mechanisms.

BACKGROUND

Seals for static and dynamic applications eventually wear out. Accordingly, there is a need for a seal assembly that either lengthens the useful operating life before wear and/or that compensates for the wear to increase the useful operating life. Rotary lip-type seals are generally made from substantially soft materials such as elastomeric materials and certain types of soft plastic materials like polytetrafluoroethylene (PTFE). These materials adjust readily to variations in tolerances and in so doing vary the areas of contact between the seal and the sealing surfaces. In dynamic applications, an increase in the area of contact between the seal and the sealing surface under high sealing stress results in a temperature increase, which causes a decrease in the tensile and shear strength of the softer seal material resulting in a decrease in seal life. The greater the area of contact, the higher the temperature at the sealing area and the faster the seal will likely fail.

Many high temperature seal materials have a higher modulus of elasticity with a higher hardness. The higher hardness reduces flexibility, making it more difficult to affect sealing. These materials thus generally make poor lip-type seals. In order to achieve good sealing, higher modulus materials generally require higher sealing stress than low modulus materials. Furthermore, in order to achieve long seal life, the appropriate sealing stress determined by the viscosity of the media and the dynamic sealing temperature should be known. Since hard plastic materials that can withstand elevated temperatures generally have very low elongation, the range in tolerances of sealing stress under which they can function properly is limited.

SUMMARY

The various embodiments of the present cartridge seal assemblies and associated methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One embodiment of the present cartridge seal assemblies comprises a cartridge defining a cavity, and a seal assembly disposed within the cavity. The seal assembly includes an annular sealing member having a lip configured for sealing engagement with the rotatable shaft. The seal assembly further includes a sealing retaining ring and a canted-coil spring disposed between the sealing member and the sealing retaining ring. The sealing retaining ring is axially translatable toward and away from the sealing member. When the sealing retaining ring is translated axially toward the sealing member, the canted-coil spring is compressed between the sealing retaining ring and the lip of the sealing member with increased force, and the lip is forced radially against the shaft with increased force due to the increased compression in the spring.

Another embodiment of the present cartridge seal assemblies comprises a cartridge defining a cavity, and a seal assembly disposed within the cavity. The seal assembly includes an annular sealing member having a lip configured for sealing engagement with the rotatable shaft. The seal assembly further includes a canted-coil spring disposed radially outward of the lip and a sealing retaining ring that is movable with respect to the canted-coil spring. The canted-coil spring applies a radially directed compressive force to the sealing member, forcing the lip against the rotatable shaft to apply a sealing force. Movement of the sealing retaining ring with respect to the canted-coil spring further compresses the spring, thereby increasing the sealing force.

Another embodiment of the present cartridge seal assemblies comprises a cartridge defining a cavity, and a seal assembly disposed within the cavity. The seal assembly includes an annular sealing member having a lip configured for sealing engagement with the rotatable shaft. The seal assembly includes a sealing retaining ring and a canted-coil spring disposed between the sealing member and the sealing retaining ring. The sealing member is constructed of a material that is harder than polytetrafluoroethylene (PTFE). The canted-coil spring is held in compression between the sealing retaining ring and the sealing member. The spring applies a radially directed compressive force to the sealing member, forcing the lip against the rotatable shaft to apply a sealing force.

BRIEF DESCRIPTION OF THE DRAWINGS

The various embodiments of the present cartridge seal assemblies and associated methods now will be discussed in detail with an emphasis on highlighting the advantageous features. These embodiments depict the novel and non-obvious cartridge seal assemblies shown in the accompanying drawings, which are for illustrative purposes only. These drawings include the following figures, in which like numerals indicate like parts.

DETAILED DESCRIPTION

Figure 1:
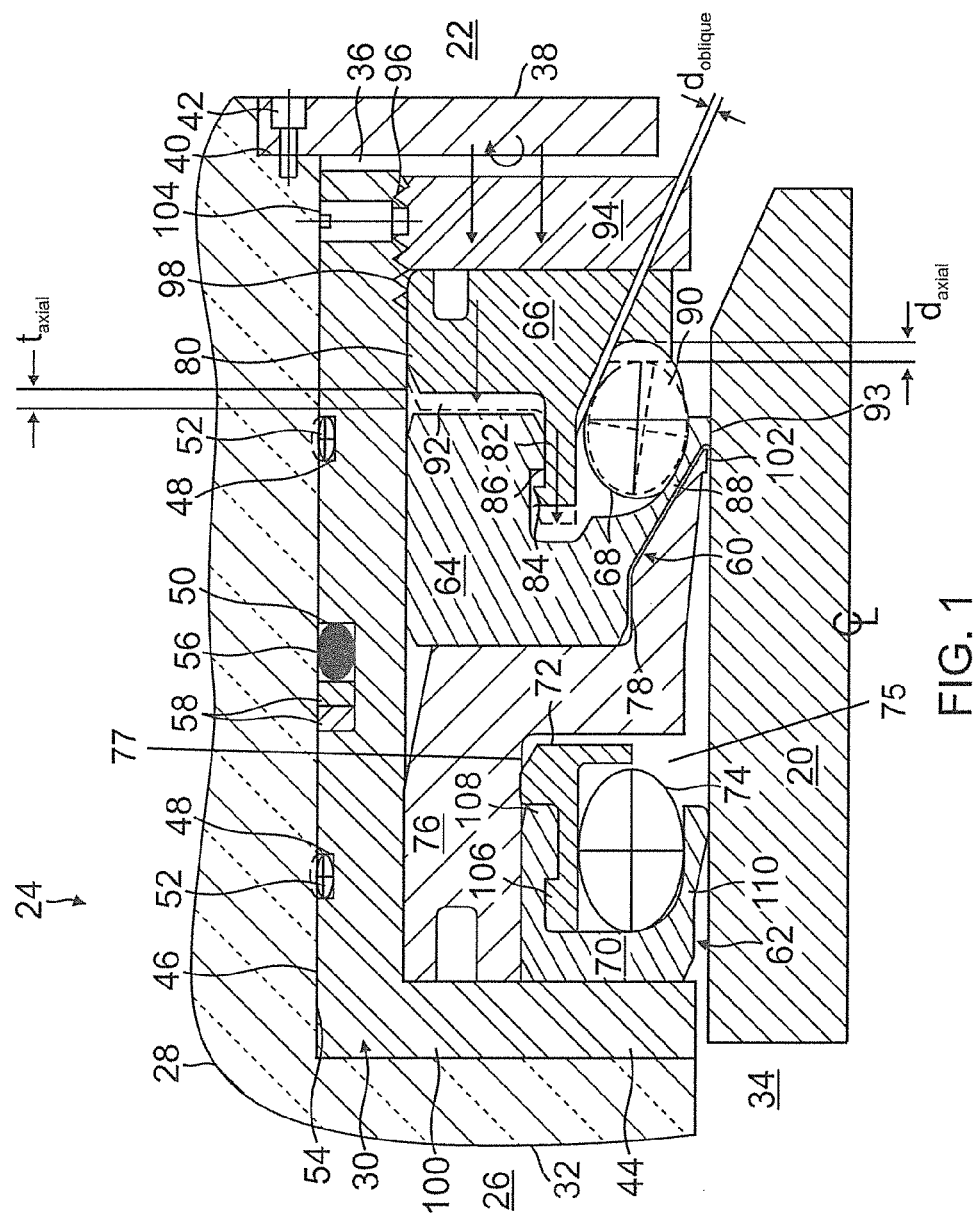
FIG. 1 is a side cross-sectional view of one embodiment of the present cartridge seal assemblies having a primary seal assembly and a secondary seal assembly, the primary seal assembly including a radial canted-coil spring having adjustable compression.

The following detailed description describes the present embodiments with reference to the drawings. In the drawings, reference numbers label elements of the present embodiments. These reference numbers are reproduced below in connection with the discussion of the corresponding drawing features.

The embodiments of the present cartridge seal assemblies and associated methods are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

The embodiments of the present cartridge seal assemblies and associated methods include garter-type canted-coil springs. Because these springs are well known in the art, a detailed discussion of their structure and characteristics will not be provided here. However, a general discussion of these springs is set forth in U.S. Pat. Nos. 4,655,462, 4,826,144, 4,830,344, 4,893,795, 4,876,781, 4,907,788, 4,915,366, 4,961,253, 4,974,821, 4,964,204, 5,160,122, 5,108,078, 5,139,243, 5,139,276, 5,203,849, 5,239,737, 5,503,375, 5,615,870, 5,709,371 and 5,791,638. Each of these patents is expressly incorporated herein by reference.

FIG. 1 illustrates one embodiment of the present cartridge seal assemblies. The present cartridge seal assemblies are configured for sealing around a rotatable shaft 20. The shaft 20 may be, as example, an impeller shaft, a pump shaft, and a compressor shaft. To a first side 22 of the illustrated seal assembly 24 is a high pressure fluid (not shown). To a second side 26 is a fluid (not shown) at a lower pressure, such as atmospheric pressure. The seal assembly 24 is configured to prevent the high pressure fluid from leaking to the second side 26 by providing a fluid tight seal about the shaft 20. For clarity, FIG. 1 and all subsequent figures illustrate only a top half of the shaft 20 and the cartridge seal assembly 24. The full assembly includes a mirror image of the illustrated assembly 24 taken about the centerline C.

The seal assembly 24 of FIG. 1 includes a cartridge 28 that defines a substantially cylindrical interior cavity 30. An end wall 32 of the cartridge 28 partially closes the first end of the cavity 30, but includes a central opening 34 to accommodate the shaft 20. A second end 36 of the cavity 30 is open, but receives a retaining plate 38. In the illustrated embodiment, the second end 36 of the cartridge 28 includes an annular shoulder 40 that receives the retaining plate 38. Fastening members 42, such as screws or bolts, secure the retaining plate 38 to the cartridge 28.

The cavity 30 receives a substantially cylindrical housing 44 in close fitting engagement. An outer surface 46 of the housing 44 includes annular grooves 48, 50. In the illustrated embodiment, three annular grooves 48, 50 are shown, but alternative embodiments may include any number of grooves 48, 50. The outer two grooves 48 each receive a radial canted-coil spring 52 that is held in compression between the interior surface 54 of the cartridge 28 and the groove 48 in the housing 44. The compressed springs 52 provide a retention force that helps to hold the housing 44 within the cartridge 28. In other embodiments, axial canted coil springs are used with tapered bottom grooves 48. The center groove 50 receives an elastomeric O-ring 56 that is held in compression between the interior surface 54 of the cartridge 28 and the groove 50 in the housing 44. The O-ring 56 provides a seal at the interface of the cartridge 28 and the housing 44. Since the cartridge 28 and the housing 44 are stationary with respect to one another, the O-ring 56 provides adequate sealing even when the pressure on the first side 22 is high. Backup rings 58 within the center groove 50 support the O-ring 56. However, in alternative embodiments the backup rings 58 may be eliminated if the center groove 50 is appropriately sized for retaining the O-ring 56. Also, in alternative embodiments additional O-rings may be provided.

The housing 44 receives a primary seal assembly 60 and a secondary seal assembly 62. The primary seal assembly 60 is located toward the high pressure side 22 of the overall assembly 24, and the secondary seal assembly 62 is located toward the low pressure side 26 of the overall assembly 24. The primary seal assembly 60 includes an annular sealing member 64, an annular sealing retaining ring 66 and a garter-type radial canted-coil spring 68. The secondary seal assembly 62 similarly includes an annular sealing member 70, an annular sealing retaining ring 72 and a garter-type radial canted-coil spring 74. An annular backup ring 76 is positioned between the primary seal assembly 60 and the secondary seal assembly 62. The backup ring 76 includes an inside longitudinally extending shelf 78 upon which the primary sealing member 64 contacts and an outside longitudinally extending shelf 79 upon which the sealing retaining ring 72 contacts. The outside longitudinally extending shelf 79 and the shaft 20 define a holding space 75 having the secondary seal assembly 62 located therein.

With reference to the primary seal assembly 60, the primary sealing retaining ring 66 includes a main body portion 80 and a ring portion 82 that extends longitudinally toward the primary sealing member 64. The ring portion 82 includes a tab 84 at its end that interlocks with a tab 86 on the primary sealing member 64 to secure the two components together. The primary sealing member 64 includes a lip portion 88 that extends both toward the primary sealing retaining ring 66 and radially inward. Together, the main body portion 80, the ring portion 82 and the lip portion 88 form a pocket or cavity 90 that receives the primary canted-coil spring 68. As further detailed below, the primary sealing retaining ring 66 is spaced from the primary sealing member 64 across a gap 92. The primary sealing retaining ring 66 is thus translatable axially toward and away from the primary sealing member 64. In the illustrated embodiment, dashed lines indicate the position of the primary sealing retaining ring 66 after an axial translation across a distance $t_{axial}$. When the primary sealing retaining ring 66 moves toward the primary sealing member 64 across the distance $t_{axial}$, the size of the pocket 90 shrinks or decreases because the primary sealing member 64 is stationary, except for some deflection that occurs in the lip portion 88. The shrinking pocket 90 exerts pressure on and deflects the primary canted-coil spring 68 as indicated by $d_{axial}$ and $d_{oblique}$ in FIG. 1. The deflected primary canted-coil spring 68 is represented by dashed lines in FIG. 1. The deflection of the primary canted-coil spring 68 increases the compression therein. The increased compression in turn forces the lip portion 88 against the shaft 20 at an interface 93. The lip portion 88 thus provides sealing about the shaft 20 at the interface 93. Further increased compression of the primary canted-coil spring 68 provides increased sealing at the interface 93.

The seal assembly of FIG. 1 further comprises an axial adjustment ring 94 that bears against the primary sealing retaining ring 66. In the illustrated embodiment, the axial adjustment ring 94 includes threads 96 at its periphery that engage threads 98 on the interior surface of the housing 44 at its open end. The threaded engagement between the axial adjustment ring 94 and the housing 44 enables the axial adjustment ring 94 to translate axially with respect to the cartridge 28 when it is rotated with respect to the cartridge 28. Rotation of the axial adjustment ring 94 with respect to the housing 44 may be effected manually or with an independent motor, for example. The threads may be left-handed or right-handed and the adjustment ring 94 may include surface features to facilitate rotation, such as by hand or a turning tool or device.

Axial movement of the axial adjustment ring 94 with respect to the cartridge 28 induces axial movement of the primary sealing retaining ring 66 with respect to the cartridge 28. The primary sealing member 64 bears against the backup ring 76, which bears against an end wall 100 of the housing 44, which bears against the end wall 32 of the cartridge 28. The primary sealing member 64 is thus stationary with respect to the cartridge 28.

As the primary sealing retaining ring 66 moves toward the primary sealing member 64, the size of the pocket 90 shrinks because the primary sealing member 64 is stationary. The shrinking pocket 90 pivots and compresses the primary canted-coil spring 68. From the perspective shown in FIG. 1, the primary canted-coil spring 68 pivots clockwise as shown by the solid and dashed center lines. The manner and extent of pivoting may be regulated by the geometry of the pocket, which is defined at least in part by the shape of the primary sealing retaining ring 66. Increased compression in the primary canted-coil spring 68 causes it to bear harder against the lip portion 88. If the lip portion 88 is spaced from the shaft 20 or is not sufficiently pressed against the shaft, such as due to wearing, the applied force from the primary canted-coil spring 68 bends the lip portion 88 so that it contacts or further presses against the shaft 20 to provide sealing engagement at the interface 93. The applied force may also cause the shelf portion 78 of the backup ring 76 to bend. In one embodiment, a lip 102 on the backup ring 76 bears against the shaft 20 to concurrently provide the primary seal function for the cartridge seal assembly 24 along with the lip portion 88. In another embodiment, the lip 102 alone provides the primary sealing function.

Further compression of the primary canted-coil spring 68 increases the force that the lip portion 88 applies around the shaft 20, increasing the sealing ability of the lip portion 88. As the canted coil spring 90 provides a generally constant force over a range of compression, it exerts a force on the seal to provide sufficient sealing around the shaft when the seal wears. To decrease the sealing force around the shaft 20, the axial adjustment ring 94 may be backed out so that the primary sealing retaining ring 66 moves away from the primary sealing member 64 as the primary canted-coil spring 68 relaxes. When the desired sealing force has been achieved, a locking screw 104 may be tightened to retain the axial adjustment ring 94 in the desired position relative to the cartridge 28. In the illustrated embodiment, the locking screw 104 extends through the housing 44 to engage the axial adjustment ring 94. The locking screw 104 may be tightened prior to inserting the housing 44 within the cartridge 28.

With continued reference to FIG. 1, the secondary seal assembly 62 resides in an annular space bounded by the housing end wall 100, the shaft 20 and the backup ring 76. The secondary sealing member 70 is shaped substantially as a C in cross-section and receives the secondary canted-coil spring 74 and the secondary sealing retaining ring 72. As in the primary seal assembly 60, the secondary sealing member 70 and the secondary sealing retaining ring 72 include interlocking tabs 106, 108 that secure the two components together. The secondary canted-coil spring 74 is held in compression within the secondary sealing member 70 and the secondary sealing retaining ring 72. The secondary canted-coil spring 74 thus exerts a spring return force that urges the lip portion 110 of the secondary sealing member 70 into sealing engagement with the shaft 20. The secondary seal assembly 62 acts as a backstop to the primary seal assembly 60, catching any fluid that may leak through the primary seal assembly 60 and preventing it from escaping the overall seal assembly 24. Thus the secondary sealing member 70 can be made of a softer material as compared to the material of the primary sealing member 64. The secondary seal assembly 62 may, for example, provide added sealing ability during startup, especially for fluids that are difficult to seal. As the pressure or temperature or both increase during service, the sealing ability of the primary seal assembly 60 may increase, making it less likely that fluid would leak past the primary seal assembly 60.

The cartridge seal assembly 24 of FIG. 1 advantageously enables adjustment of the sealing force applied to the shaft 20 at the location of the primary sealing member 64. Applying a strong sealing force with the primary sealing member 64 allows the primary sealing member 64 to be made from a material that has a relatively high modulus of elasticity and that is relatively hard. The hardness of the material makes it more durable, so that the cartridge seal assembly 24 enjoys a longer lifespan. In one embodiment, the primary sealing member 64 is made from an engineered plastic, such as polyether ether ketone (PEEK), PTFE, or VESPEL®. The secondary sealing member 70 may be made from a softer material than the primary sealing member 64. In one embodiment, the secondary sealing member 70 is made from PTFE. In one embodiment, a flushing fluid is routed to the interior space or cavity between the primary seal and the secondary seal to ensure flushing fluid between the lip portion 110 and the shaft 20.

FIGS. 2-14 illustrate alternative embodiments of the present cartridge seal assemblies. These embodiments include many similarities in structure to the embodiment of FIG. 1, which is discussed in detail above. Accordingly, the following portions of the specification will omit discussion of these similarities, and will instead focus on differences between the various embodiments.

Figure 2:
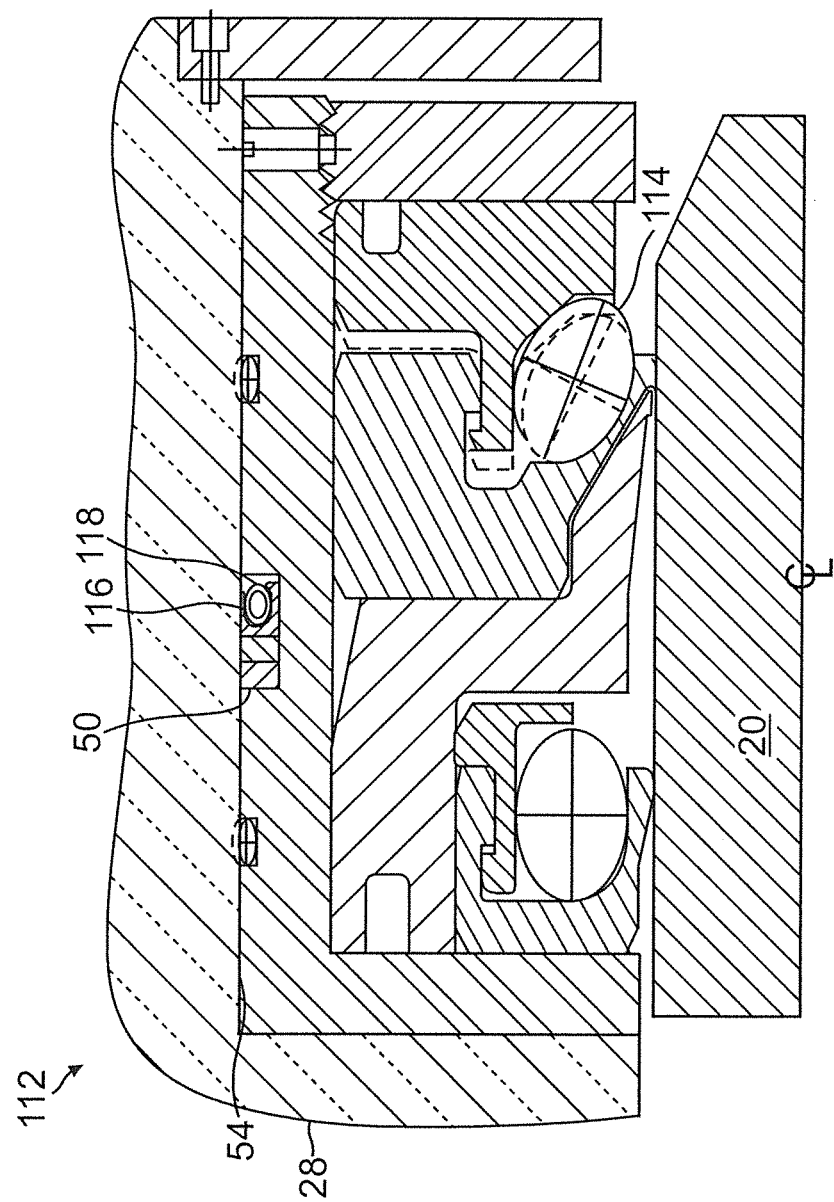
FIG. 2 is a side cross-sectional view of another embodiment of the present cartridge seal assemblies having a primary seal assembly and a secondary seal assembly, the primary seal assembly including a canted-coil spring with a turn angle and having adjustable compression.

The cartridge seal assembly 112 of FIG. 2 is substantially similar to the embodiment of FIG. 1, except that the primary canted-coil spring 114 includes a turn angle, meaning the major axis is not parallel to the axis of the shaft 20. The spring turn angle can be tailored to provide specific loading and deflection characteristics to the spring 114. Also in the embodiment of FIG. 2, the center groove 50 about the outer surface of the housing 44 includes a spring-energized sealing member 116. The sealing member 116 is substantially C-shaped and receives a garter-type canted-coil spring 118. The spring 118 is in compression. A spring return force urges the sealing member 116 against the inner surface 54 of the cartridge 28 in sealing engagement.

Figure 3:
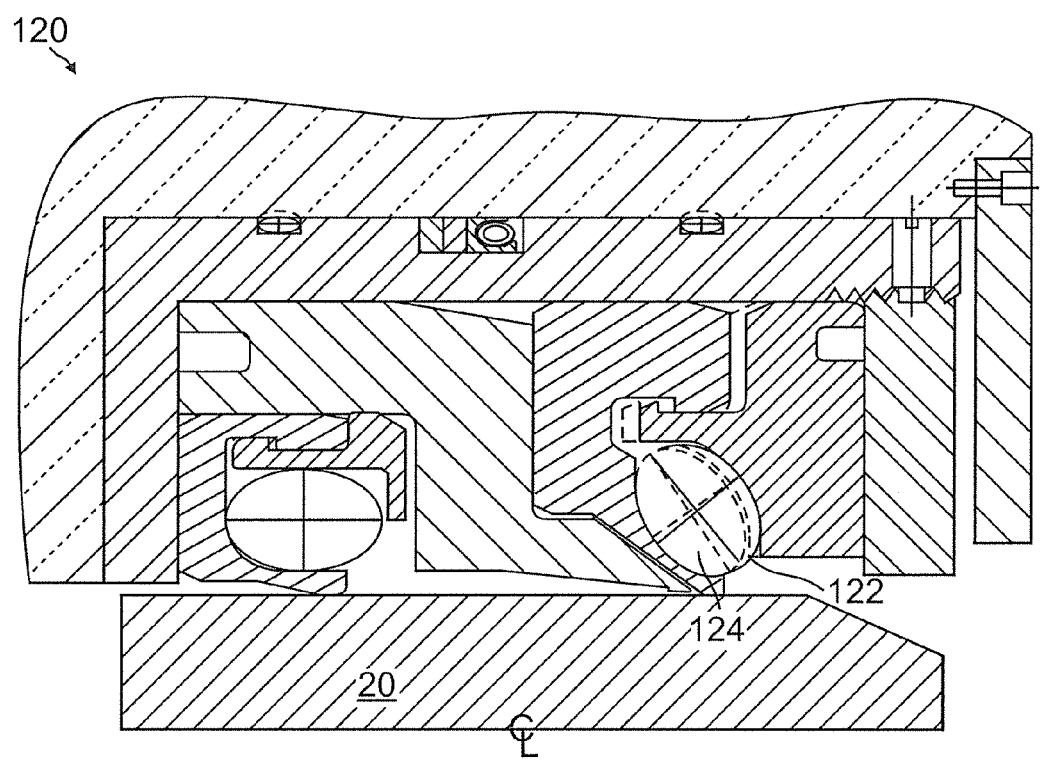
FIG. 3 is a side cross-sectional view of another embodiment of the present cartridge seal assemblies having a primary seal assembly and a secondary seal assembly, the primary seal assembly including an canted-coil spring having adjustable compression.

The cartridge seal assembly 120 of FIG. 3 is substantially similar to the embodiment of FIG. 2, except that the primary canted-coil spring 122 is an axial canted-coil spring. Thus, compressive force is applied to the spring 122 in the axial direction rather than the radial direction. The shape of the pocket 124 may be altered as needed from the configuration of FIG. 1 in order to accommodate the shape of the spring coils for the axial spring 122 and the direction of spring force.

Figure 4:
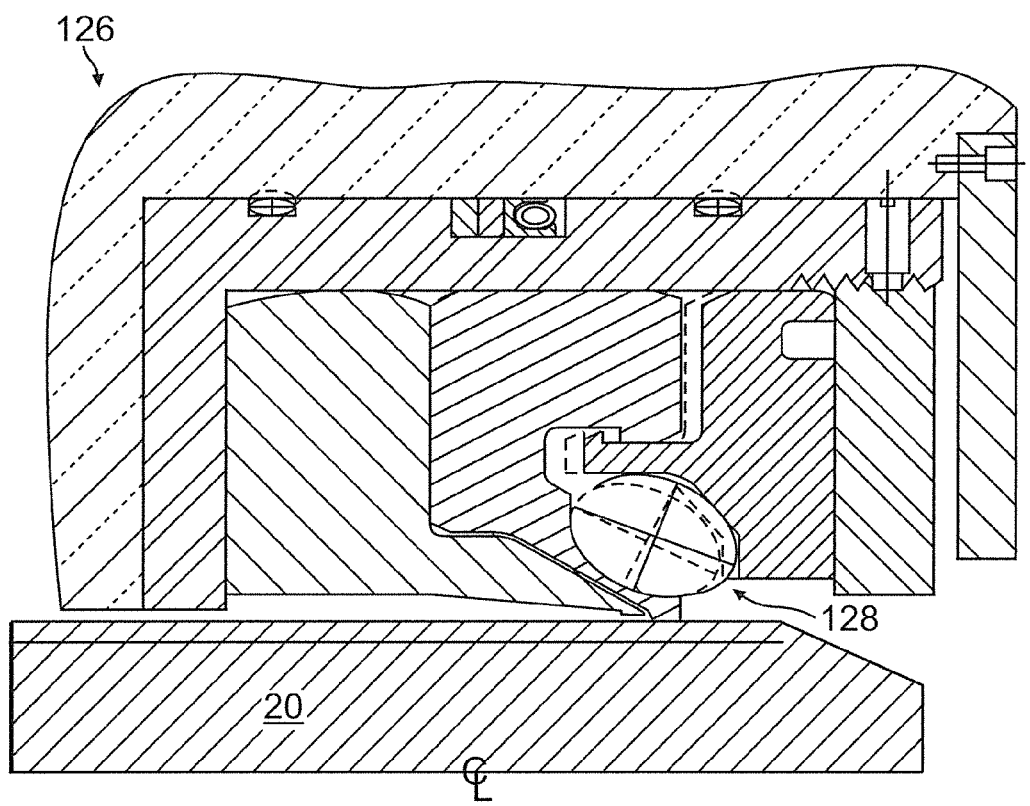
FIG. 4 is a side cross-sectional view of another embodiment of the present cartridge seal assemblies having one seal assembly, the seal assembly including a canted-coil spring with a turn angle and having adjustable compression.

The cartridge seal assembly 126 of FIG. 4 is substantially similar to the embodiment of FIG. 2, except that the secondary seal assembly has been omitted. Sealing is thus provided by the primary seal assembly 128 only.

Figure 5:
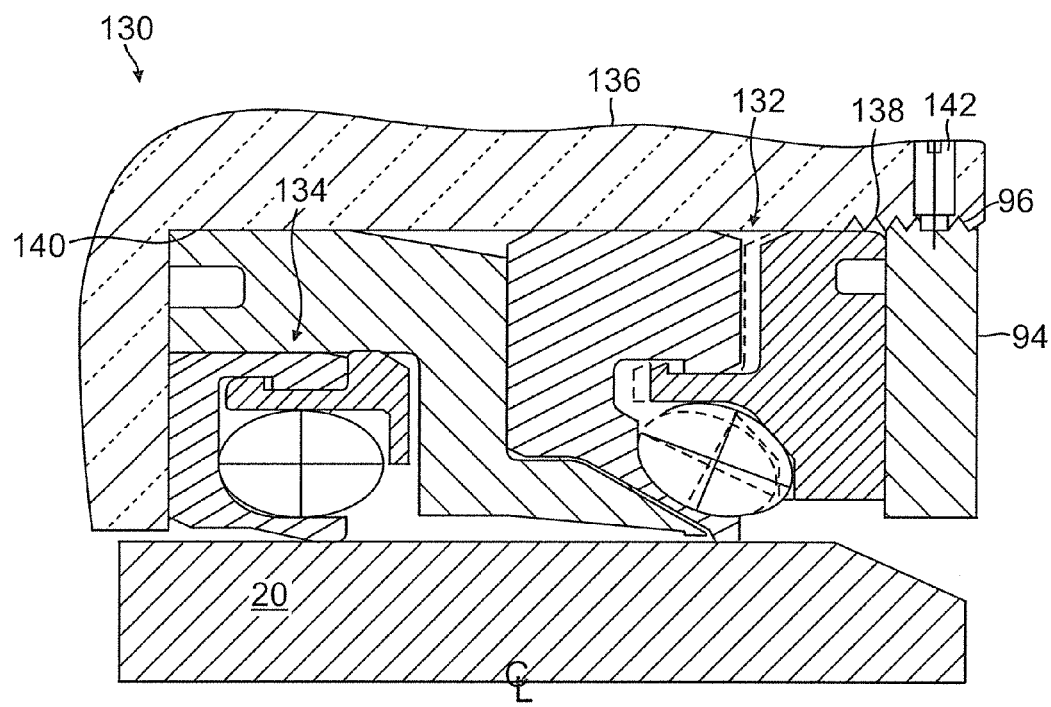
FIG. 5 is a side cross-sectional view of another embodiment of the present cartridge seal assemblies having a primary seal assembly and a secondary seal assembly, the primary seal assembly including a canted-coil spring with a turn angle and having adjustable compression.

The seal assembly 130 of FIG. 5 is substantially similar to the embodiment of FIG. 2, except that the housing has been omitted. The sealing assemblies 132, 134 are thus contained within the cartridge 136 itself. Further, the cartridge 136 includes threads 138 on its inner surface 140 that engage the threads 96 at the periphery of the axial adjustment ring 94. The cartridge 136 further includes a locking screw 142 that extends therethrough.

Figure 6:
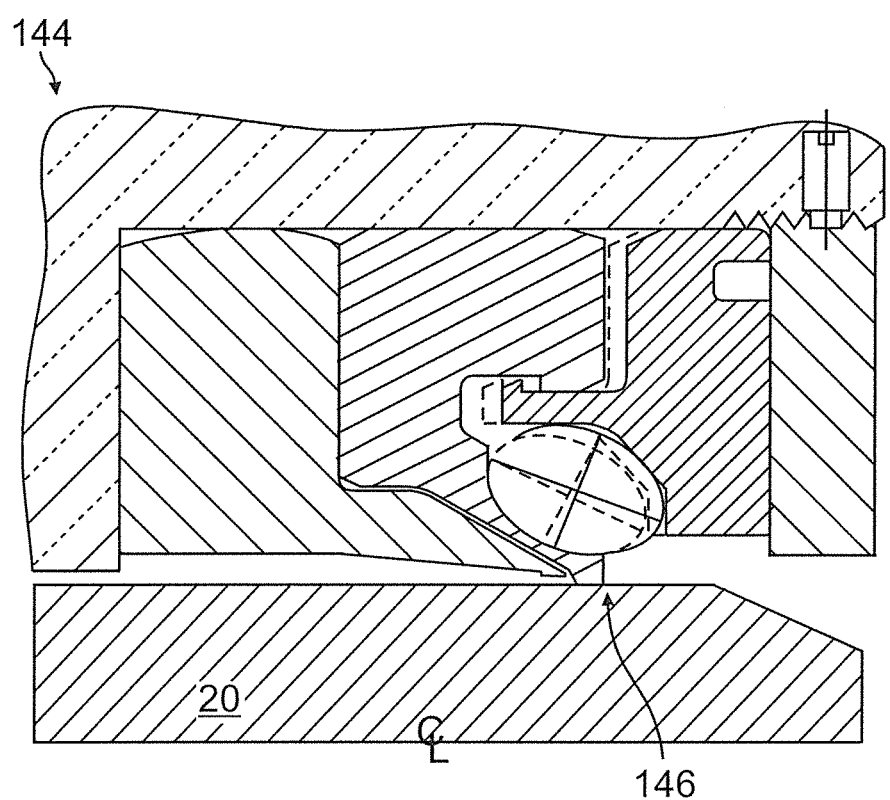
FIG. 6 is a side cross-sectional view of another embodiment of the present cartridge seal assemblies having one seal assembly, the seal assembly including a canted-coil spring with a turn angle and having adjustable compression.
Figure 7:
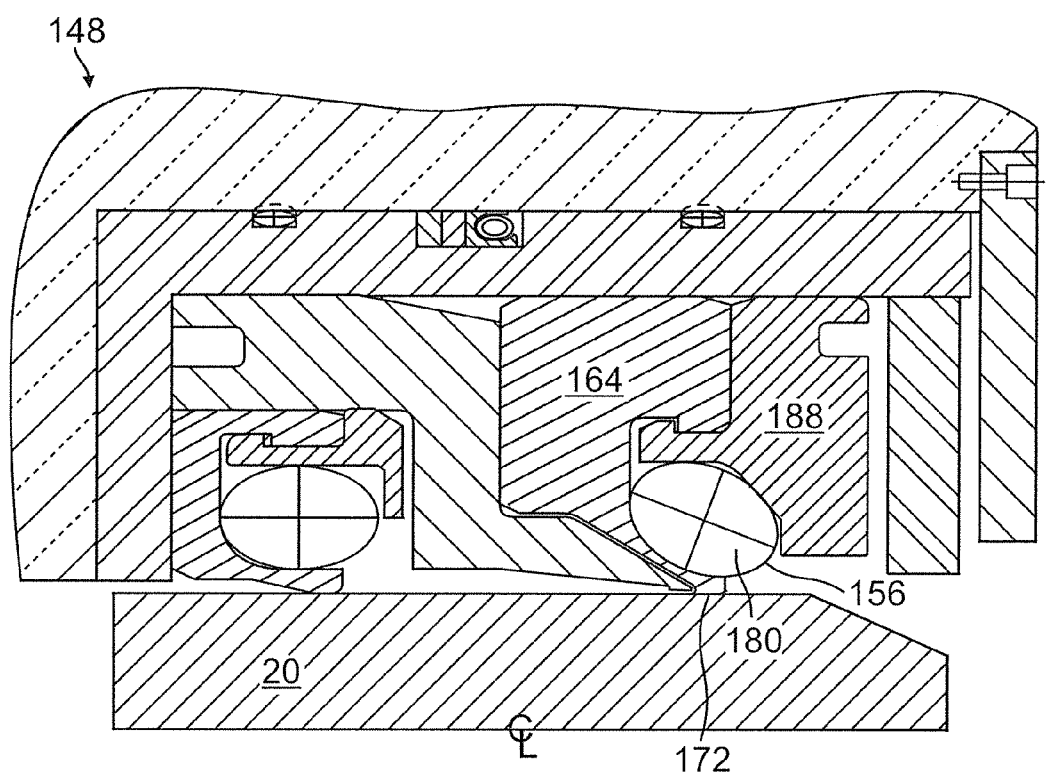
FIG. 7 is a side cross-sectional view of another embodiment of the present cartridge seal assemblies having a primary seal assembly and a secondary seal assembly, the primary seal assembly including a canted-coil spring with a turn angle.
Figure 8:
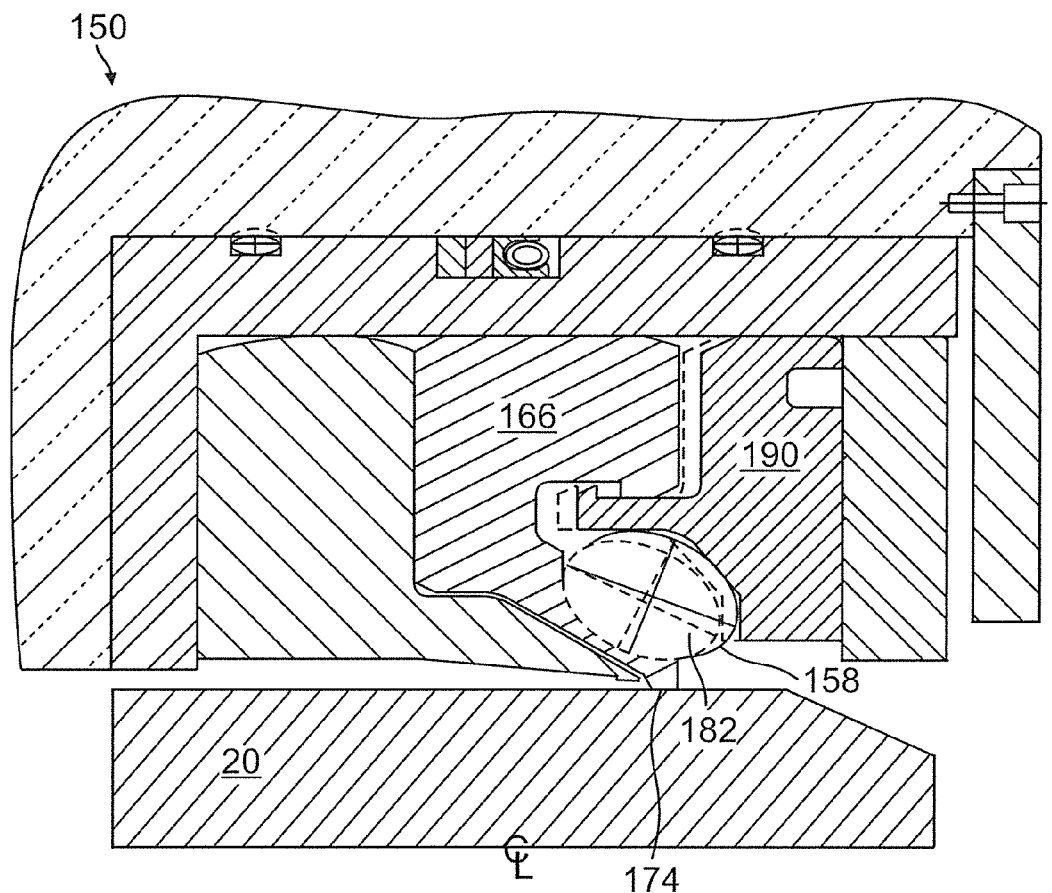
FIG. 8 is a side cross-sectional view of another embodiment of the present cartridge seal assemblies having one seal assembly, the seal assembly including a canted-coil spring with a turn angle.
Figure 9:
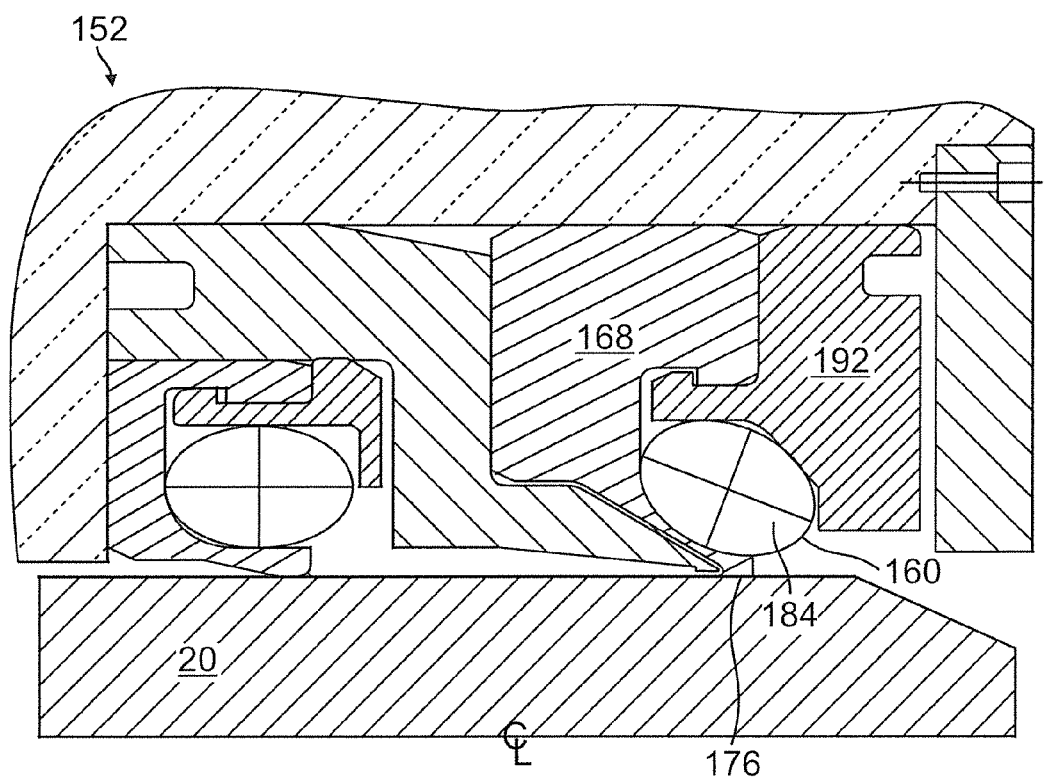
FIG. 9 is a side cross-sectional view of another embodiment of the present cartridge seal assemblies having a primary seal assembly and a secondary seal assembly, the primary seal assembly including a canted-coil spring with a turn angle.
Figure 10:
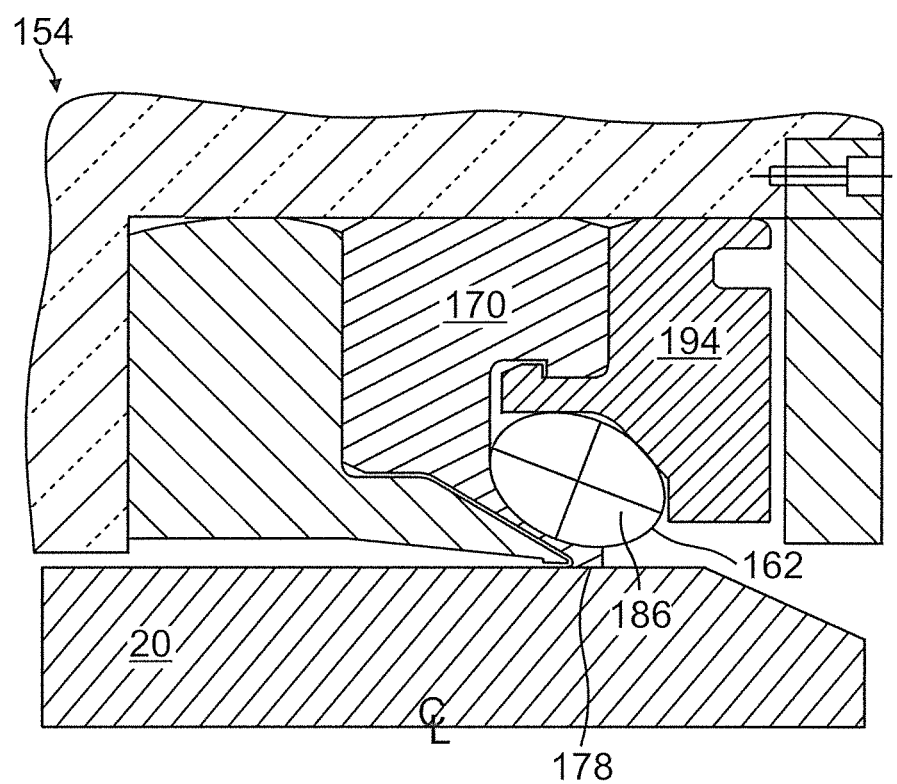
FIG. 10 is a side cross-sectional view of another embodiment of the present cartridge seal assemblies having one seal assembly, the seal assembly including a canted-coil spring with a turn angle.

The cartridge seal assembly 144 of FIG. 6 is substantially similar to the embodiment of FIG. 5, except that the secondary seal assembly has been omitted. Sealing is thus provided by the primary seal assembly 146 only.

The cartridge seal assemblies 148, 150, 152, 154 of FIGS. 7, 8, 9 and 10 are substantially similar to the embodiments of FIGS. 2, 4, 5 and 6, respectively, except that the compression applied to the primary canted-coil spring 156, 158, 160, 162 is not adjustable. In these embodiments, the primary canted-coil spring 156, 158, 160, 162 provides compression about the primary sealing member 164, 166, 168, 170 to provide a desired sealing force at the interface 172, 174, 176, 178 between the shaft 20 and the primary sealing member 164, 166, 168, 170. The primary canted-coil spring 156, 158, 160, 162 may be held in compression in the pocket 180, 182, 184, 186 formed between the primary sealing retaining ring 188, 190, 192, 194 and the primary sealing member 164, 166, 168, 170. The pocket 180, 182, 184, 186 may be sized and shaped to provide the desired compression. The primary sealing member 164, 166, 168, 170 may further be constructed of a material having a high modulus of elasticity and high hardness. For example, the primary sealing member 164, 166, 168, 170 may be constructed of PEEK. The compression provided by the primary canted-coil spring 156, 158, 160, 162 urges the relatively hard primary sealing member 164, 166, 168, 170 against the shaft 20 to provide adequate sealing.

Figure 11:
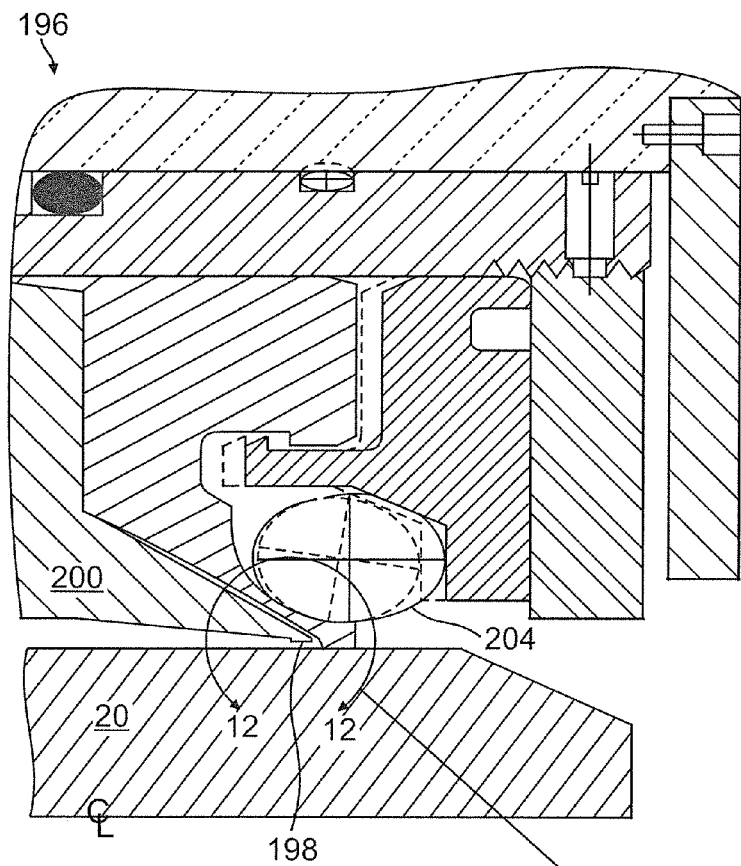
FIG. 11 is a side cross-sectional detail view of an alternative configuration for the embodiment of FIG. 1.
Figure 12:
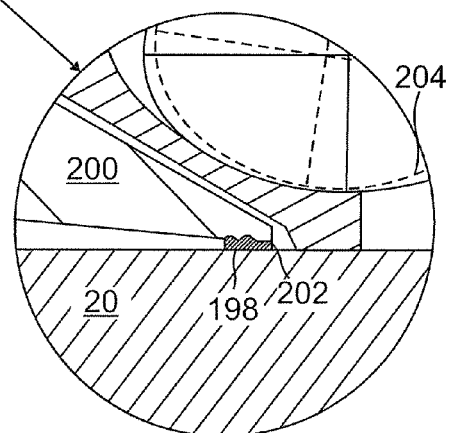
FIG. 12 is a side cross-sectional detail view of the circled portion of FIG. 11.

The cartridge seal assembly 196 of FIGS. 11 and 12 is substantially similar to the embodiment of FIG. 1, except that the lip 198 of the backup ring 200 includes a coating 202 in a region where the lip 198 may contact the shaft 20. As discussed above, in certain embodiments the lip 198 of the backup ring 200 may be urged against the shaft 20 by compression in the primary canted-coil spring 204. FIG. 12 shows a magnified view of the circled portion of FIG. 11, which includes the contact interface between the backup ring 200 and the shaft 20 where the coating 202 is located. The coating 202 may be a bearing-type material having high wear resistance and high temperature resistance to resist galling of the backup ring 200 to the shaft 20. The coating 202 material may be, for example, a plastic or a metal, such as PEEK, CELAZOLE®, aluminum, bronze, etc. In alternative embodiments the coating 202 may be a material having high tensile strength, such as steel or steel alloys.

Figure 13:
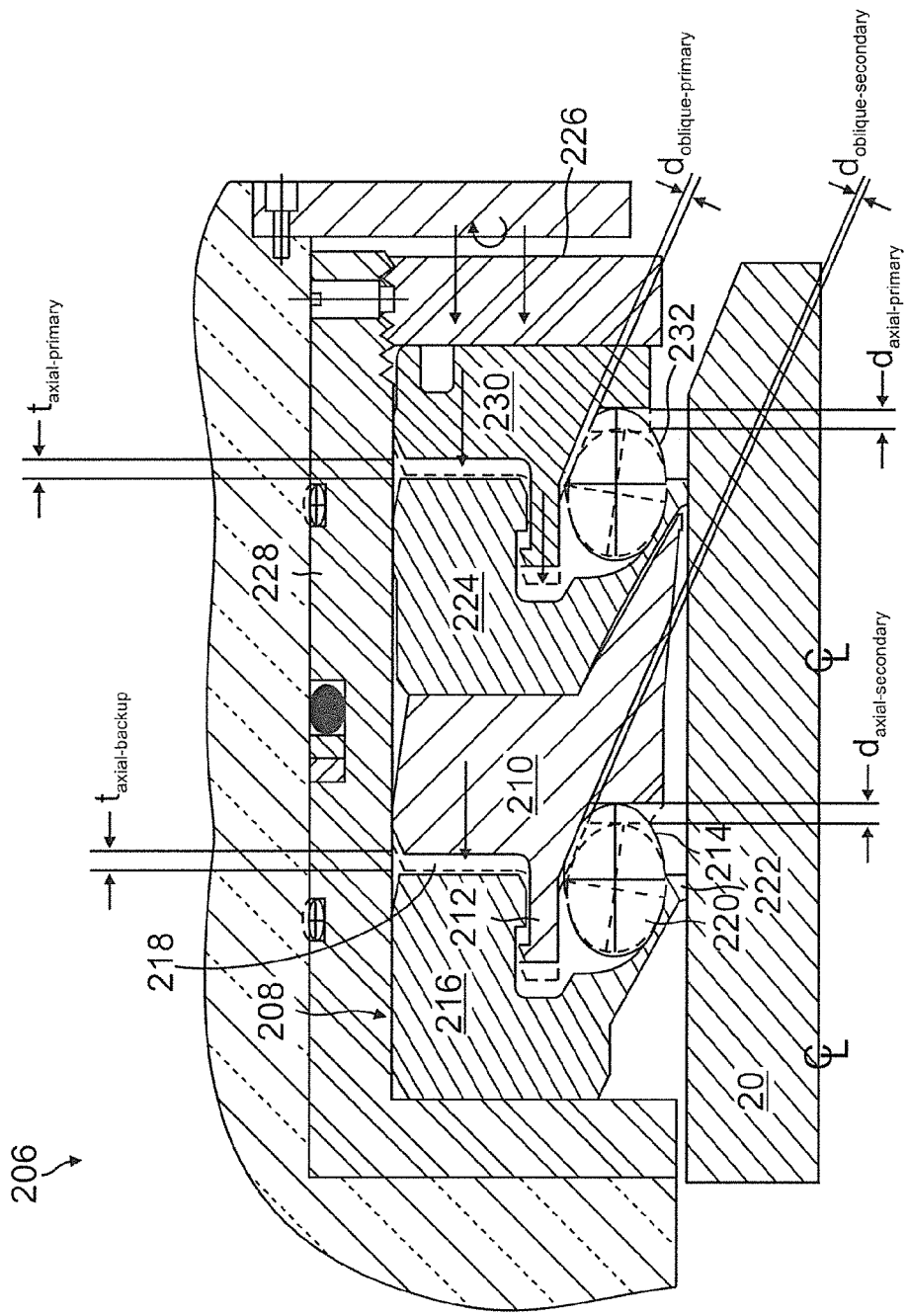
FIG. 13 is a side cross-sectional view of another embodiment of the present cartridge seal assemblies having a primary seal assembly and a secondary seal assembly, the primary and secondary seal assemblies each including an adjustable radial canted-coil spring having adjustable compression.

The cartridge seal assembly 206 of FIG. 13 is substantially similar to the embodiment of FIG. 1. However, in the embodiment of FIG. 13 the secondary sealing assembly 208 does not include a separate sealing retaining ring. Instead, the backup ring 210 includes an axially extending lip 212 that overlies the secondary canted-coil spring 214 and interlocks with the secondary sealing member 216. The backup ring 210 thus serves the function of the omitted separate sealing retaining ring.

Further, in the cartridge seal assembly 206 of FIG. 13 a compression in the secondary canted-coil spring 214 is adjustable. The backup ring 210 is spaced from the secondary sealing member 216 across a gap 218. The backup ring 210 can thus be translated axially toward the secondary sealing member 216. As the backup ring 210 moves toward the secondary sealing member 216, the width of the gap 218 shrinks or decreases. Further, the size of a pocket 220 in which the secondary canted-coil spring 214 resides also shrinks, deflecting the secondary canted-coil spring 214 and increasing the compression therein. The increased compression in turn forces the lip portion 222 of the secondary sealing member 216 against the shaft 20 with increased force, providing increased sealing.

The backup ring 210 moves toward the secondary sealing member 216 under the influence of a bearing force applied by the axially translatable primary sealing member 224. When the axial adjustment ring 226 is moved farther into the housing 228, the primary sealing retaining ring 230 moves toward the primary sealing member 224, deflecting and compressing the primary canted-coil spring 232 as discussed with respect to the above embodiments. Eventually the primary sealing retaining ring 230 bears against the primary sealing member 224. After that point, further movement of the axial adjustment ring 226 into the housing 228 forces the backup ring 210 to move toward the secondary sealing member 216, deflecting and compressing the secondary canted-coil spring 214 in a manner similar to the primary canted-coil spring 232. The axial adjustment ring 226 may be moved back and forth as needed to adjust the compression in both springs 220, 232 until the desired sealing force is applied to the shaft 20 by both the primary sealing member 224 and the secondary sealing member 216.

In an alternative embodiment, compression in the primary canted-coil spring 232, generated by axial translation of the primary sealing retaining ring 230 under the influence of the axial adjustment ring 226, may cause the primary sealing member 224 to translate into the housing 228 before the primary sealing retaining ring 230 contacts the primary sealing member 224. This motion may occur if a spring constant of the primary canted-coil spring 232 is great enough. Bearing forces and resultant motions would then propagate through the remaining components within the housing 228 similarly as described above.

The displacements and deflections of the components within the housing 228 can be described with reference to FIG. 13 as an axial translation of the primary sealing retaining ring 230 equal to $t_{axial-primary}$, an axial deflection of the primary canted-coil spring 232 equal to $d_{axial-primary}$, an oblique deflection of the primary canted-coil spring 232 equal to $d_{oblique-primary}$, an axial translation of the backup ring 210 equal to $t_{axial-backup}$, an axial deflection of the secondary canted-coil spring 214 equal to $d_{axial-secondary}$, and an oblique deflection of the secondary canted-coil spring 214 equal to $d_{oblique-secondary}$. The magnitude of each of these translations/deflections depends upon the material properties of all of the components within the housing 228, including spring constants of the primary canted-coil spring 232 and the secondary canted-coil spring 214.

Figure 14:
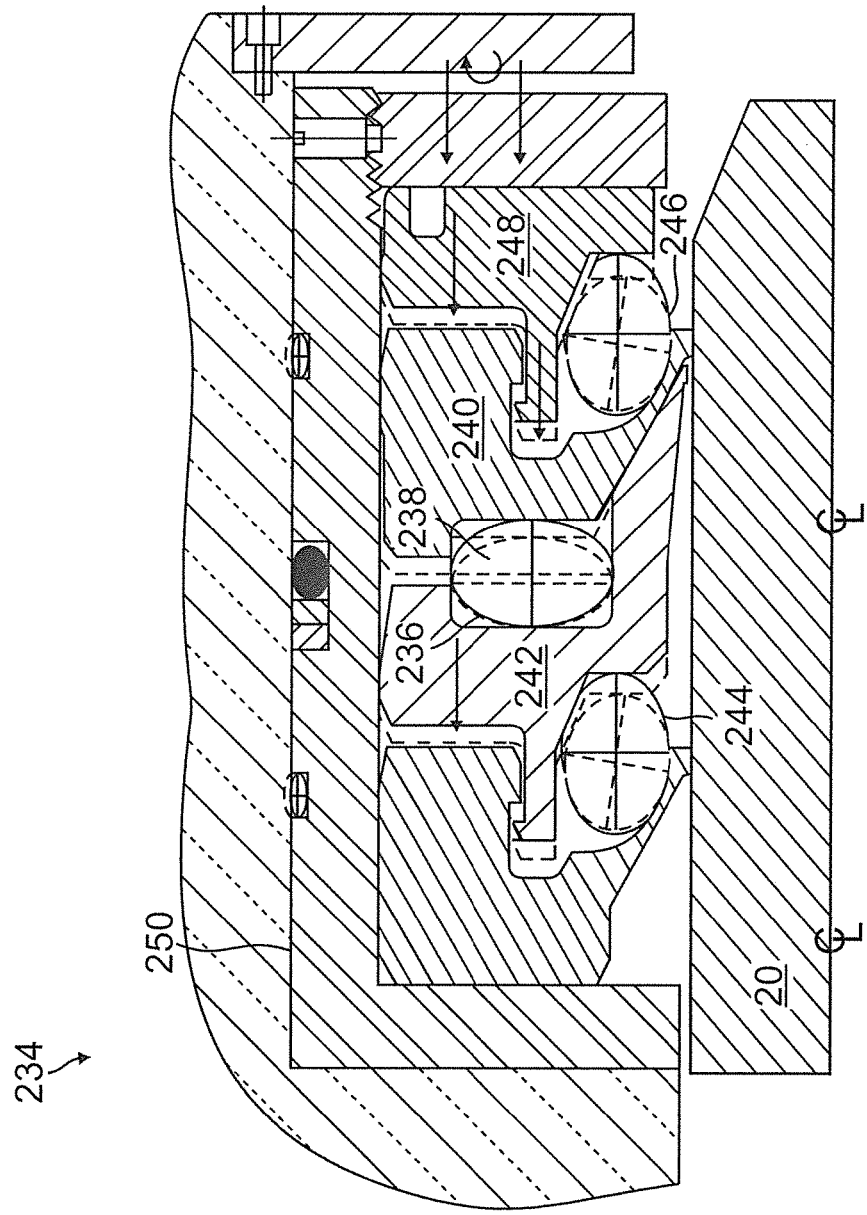
FIG. 14 is a side cross-sectional view of another embodiment of the present cartridge seal assemblies having a primary seal assembly and a secondary seal assembly, the primary and secondary seal assemblies each including an adjustable radial canted-coil spring having adjustable compression and further comprising a third canted-coil spring.

The cartridge seal assembly 234 of FIG. 14 is substantially similar to the embodiment of FIG. 13. However, in the embodiment of FIG. 14 a third canted-coil spring 236 is provided in a pocket 238 located between the primary sealing member 240 and the backup ring 242. In the illustrated embodiment, the third spring 236 is an axial spring, but in alternative embodiments the third spring 236 may be a radial spring and/or the third spring 236 may include a turn angle. The third spring 236 influences the compression of the secondary canted-coil spring 244 by acting as a buffer between the primary sealing member 240 and the backup ring 242. The third spring 236 may also influence the compression of the primary canted-coil spring 246 in embodiments where the primary sealing member 240 moves under the influence of a bearing force applied by the primary canted-coil spring 246 rather than under the influence of a bearing force applied by the primary sealing retaining ring 248. Properties of the third spring 236, such as its spring constant, can be tailored to provide a desired compression in the canted-coil springs 244, 246 in conjunction with material properties of the other components within the housing 250.

Any of the foregoing embodiments may include a lubricant between the contact surfaces at the interface(s) of the sealing member(s) and the shaft and/or at the interface of the backup ring and the shaft. The lubricant may be a fluid from an external source or fluid that is being sealed by the primary seal and directed into the seal assembly. The lubricant increases the lifespan of the sealing member(s) and/or backup ring by reducing the friction, and heat caused by friction, at the interface(s) of moving parts. The lubricant is particularly advantageous in high pressure applications, which otherwise could produce enough heat to alter material properties of the sealing member(s) and/or backup ring and decrease sealing performance. With reference to FIG. 1, the lubricant may be introduced into a void space bounded by the shaft, the secondary sealing assembly and the backup ring. The lubricant in the void space may dissipate heat from the interfaces of moving parts.

Certain of the present embodiments provide a cartridge seal assembly comprising at least one lip-type seal having a sealing force that is adjustable or non-adjustable and energized by a canted-coil spring. The canted-coil spring energizing the lip-type seal may be a radial spring or an axial spring, and may or may not include a turn angle. Embodiments may include a cavity that houses a canted-coil spring, the cavity defined partially by a section of a lip-type seal and partially by a section of a second part that is axially translatable toward and away from the lip-type seal to adjust a force, compression, and/or position of the canted-coil spring in the cavity. Adjustment of the force, compression, and/or position of the canted-coil spring may adjust the spring force on the lip-type seal. In certain of these embodiments the mechanism for adjusting the axial position of the second part is a threaded ring in operative engagement with the second part. The threaded ring can be moved axially toward or away from the lip-type seal, thus pushing the second part toward or allowing it to travel away from the lip-type seal and altering the size of the cavity.

Certain of the present embodiments may use an appropriate spring force acting between the seal and the shaft to provide a desired sealing ability based on various parameters, such as temperature, pressure, speed of rotation, and/or type of fluid media. The appropriate spring force may be selected to achieve longer seal life. Adjustability of spring force allows for compensating for wear of the seals during use. Seal wear may cause leakage due to a reduction in the seal force. Non-adjustable embodiments of the present cartridge seals may provide compression of the canted-coil spring, which can provide varying sealing force, depending on the position of the canted-coil spring. The canted-coil spring allows for improved seal life, improved and consistent sealing ability, and the ability to use harder sealing materials, since the spring force can be accurately controlled. Harder sealing materials offer longer seal life and higher operating temperatures.

In certain of the present embodiments, means for measuring torque may be provided. The torque may be derived in part by the frictional force measured between the shaft and one or more of the sealing members. A decrease in the measured torque indicates that the sealing member has worn.

In certain of the present embodiments, increased interference between the sealing member(s) and the shaft increases friction, which increases sealing ability. Means for detecting variations in frictional force can be incorporated to enable precise application of a desired force to the shaft. The desired force can be generated by applying a force to energize the canted-coil spring, thus transmitting a force to the sealing member(s) to provide the needed sealing force for a given application to maintain appropriate sealing.

In certain alternative embodiments, the axial adjustment ring may be replaced with another type of actuator that bears on the primary sealing retaining ring to generate the desired sealing force at the sealing interface of the shaft. The alternative actuator may be, for example, a pneumatic or hydraulic ram or any other type of actuator.

In certain embodiments, the primary sealing member is made from a plastic having a hardness greater than PTFE. PTFE has a hardness value of between D50 and D60, measured according to the method ASTM D2240, and a hardness value of between 27 and 32 N/mm$^2$, measured according to the method DIN 53456 (a load of 13.5 kg for 30 seconds). In one embodiment the primary sealing member is made from PEEK, which has a hardness value of D85, measured according to the method ASTM D2240.

In certain of the present embodiments having non-adjustable sealing force, the sealing force may be provided by the compression of the canted-coil spring. The spring may be positioned in such a manner to provide a combination of radial force and axial force, depending on the angular position of the canted-coil spring.

In the present embodiments, various factors may can affect the capacity of the seal assembly to seal around the shaft. These factors may include mechanical properties of the sealing member(s), such as tensile elongation, diameter reading, and other factors. Properties of the shaft may also affect sealing, such as surface finish, eccentricities, the shaft being out of tolerance, etc. Seal life may be affected by the friction generated between the sealing member(s) and the shaft, which is directly related to the coefficient of friction and the properties of the fluid media being sealed. Fluid media with high viscosity is easier to seal than fluid media with very low viscosity. For example, gases with very low viscosity are substantially more difficult to seal than liquids.

Other factors that can affect sealing and seal life include surface tension, viscosity, temperature, pressure, etc. Aspects of the present embodiments may include the interplay of one or more of the foregoing factors with the ability to control the seal point or points between the contact surfaces using either adjustable or non-adjustable force generating mechanisms or both. The seal assemblies discussed herein can be practiced with seal materials that are commercially available and have a high degree of wear resistance that can benefit from periodic adjustment to maintain sealing integrity.

The above description presents the best mode contemplated for carrying out the present cartridge seal assemblies and associated methods, and of the manner and process of making and using it, in such full, clear, concise, and exact terms as to enable any person skilled in the art to which it pertains to make and use these cartridge seal assemblies. These cartridge seal assemblies are, however, susceptible to modifications and alternate constructions from that discussed above that are fully equivalent. Furthermore, aspects or features expressly discussed for one embodiment may be incorporated in another embodiment provided the overall functionality is compatible. Consequently, these cartridge seal assemblies are not limited to the particular embodiments disclosed. On the contrary, these cartridge seal assemblies cover all modifications and alternate constructions coming within the spirit and scope of the cartridge seal assemblies as generally expressed by the following claims, which particularly point out and distinctly claim the subject matter of the cartridge seal assemblies.

What is claimed is:

1. A seal assembly for sealing around a rotatable shaft, the seal assembly comprising: a primary seal comprising a first sealing member having an inside flange with a seal lip for sealing against a movable shaft, a first sealing retaining ring engaging the first sealing member and together with the first sealing member defining a spring cavity having a canted coil spring located therein biasing against the seal lip and at least part of the first sealing retaining ring; a backing ring having a radial wall supporting a central portion of the first sealing member and having an outside longitudinal extending shelf and an inside longitudinal extending shelf, said inside longitudinal extending shelf supporting the inside flange of the first sealing member; and a secondary seal comprising a second sealing member having an inside flange with a seal lip for sealing against a movable shaft, a second sealing retaining ring engaging the second sealing member and together with the second sealing member defining a spring cavity having a second canted coil spring located therein biasing against the seal lip and at least part of the second sealing retaining ring; a top of said second sealing retaining ring in contact with the outside longitudinal extending shelf to retain the secondary seal to the backing ring.

2. The seal assembly of claim 1, wherein the primary seal, the backing ring, and the secondary seal are entirely positioned inside an interior cavity of a cartridge housing.

3. The seal assembly of claim 2, further comprising an axial adjustment ring in operative engagement with the first sealing retaining ring, wherein axial movement of the axial adjustment ring with respect to the cartridge induces axial movement of the first sealing retaining ring with respect to the cartridge.

4. The seal assembly of claim 1, wherein the outside longitudinal extending shelf and a movable shaft define a holding space having the secondary seal located therein.

5. A seal assembly for sealing around a rotatable shaft, the seal assembly comprising: a primary seal supported by a backing ring and a secondary seal located in a holding space defined by the backing ring and a movable shaft; wherein the primary seal comprises a first sealing member having an inside flange with a seal lip for sealing against the movable shaft, a first sealing retaining ring engaging the first sealing member and together with the first sealing member defining a spring cavity having a canted coil spring located therein biasing against the seal lip and at least part of the first sealing retaining ring; the backing ring having a radial wall supporting a central portion of the first sealing member and having an outside longitudinal extending shelf and an inside longitudinal extending shelf, said inside longitudinal extending shelf supporting the inside flange of the first sealing member; and the secondary seal comprising a second sealing member having an inside flange with a seal lip for sealing against the movable shaft, a second sealing retaining ring engaging the second sealing member and together with the second sealing member defining a spring cavity having a second canted coil spring located therein biasing against the seal lip and at least part of the second sealing retaining ring; a top of said second sealing retaining ring in contact with the outside longitudinal extending shelf to retain the secondary seal to the backing ring.

6. The seal assembly of claim 5, further comprising a cartridge housing having a bore and wherein the primary seal, the backing ring, and the secondary seal are located inside the bore of the cartridge housing.

7. The seal assembly of claim 5, further comprising an adjustment ring in abutting contact with the first sealing retaining ring.

8. The seal assembly of claim 1, wherein the backing ring cross section forms a "Z" shape.

9. The seal assembly of claim 1, further comprising a housing, and wherein a portion of an outside flange of the secondary seal engaged by the second sealing retaining ring does not contact the housing.

10. The seal assembly of claim 1, wherein a biasing force of the primary seal is adjustable.

11. The seal assembly of claim 1, wherein an outside surface of an outside flange of the primary seal contacts the housing.

12. The seal assembly of claim 5, wherein the backing ring cross section forms a "Z" shape.

13. The seal assembly of claim 5, further comprising a housing, and wherein a portion of an outside flange of the secondary seal engaged by the second sealing retaining ring does not contact the housing.

14. The seal assembly of claim 5, wherein a biasing force of the primary seal is adjustable.

15. The seal assembly of claim 5, wherein an outside surface of an outside flange of the primary seal contacts the housing.

* * * * *

UNITED STATES PATENT AND TRADEMARK OFFICE
CERTIFICATE OF CORRECTION

| | | |
|---|---|---|
| PATENT NO. | : 9,285,034 B2 | Page 1 of 1 |
| APPLICATION NO. | : 14/242687 | |
| DATED | : March 15, 2016 | |
| INVENTOR(S) | : Pete Balsells et al. | |

It is certified that error appears in the above-identified patent and that said Letters Patent is hereby corrected as shown below:

In the specification

In column 4, line 23, delete "C." and insert -- ₡. --, therefor.

In column 11, line 9, after "may" delete "can".

Signed and Sealed this
Twenty-third Day of August, 2016

Michelle K. Lee
*Director of the United States Patent and Trademark Office*